(12) United States Patent
Devenyi

(10) Patent No.: US 7,249,534 B1
(45) Date of Patent: Jul. 31, 2007

(54) LEADSCREW MECHANICAL DRIVE WITH DIFFERENTIAL LEADSCREW FOLLOWER STRUCTURE

(75) Inventor: Gabor Devenyi, Penetang (CA)

(73) Assignee: Raytheon Company, Waltham, MA (US)

( * ) Notice: Subject to any disclaimer, the term of this patent is extended or adjusted under 35 U.S.C. 154(b) by 690 days.

(21) Appl. No.: 10/799,058

(22) Filed: Mar. 12, 2004

Related U.S. Application Data

(63) Continuation-in-part of application No. 10/271,479, filed on Oct. 15, 2002, now Pat. No. 6,931,960.

(51) Int. Cl.
*F16H 27/02* (2006.01)
(52) U.S. Cl. ................ 74/424.95; 74/424.94
(58) Field of Classification Search ............ 74/424.94, 74/424.95, 424.96, 424.79, 424.78
See application file for complete search history.

(56) References Cited

U.S. PATENT DOCUMENTS

| | | | |
|---|---|---|---|
| 4,794,810 A * | 1/1989 | Parsons ................ 74/424.94 |
| 5,533,417 A | 7/1996 | Devenyi |
| 5,636,549 A | 6/1997 | Devenyi |
| 5,732,597 A | 3/1998 | Devenyi |
| 5,857,383 A | 1/1999 | Devenyi |
| 2004/0237687 A1 * | 12/2004 | Devenyi ................ 74/424.95 |

* cited by examiner

*Primary Examiner*—David M. Fenstermacher
(74) *Attorney, Agent, or Firm*—Rene Grossman, Esq.; Leonard A. Alkov, Esq.; H. St. Julian, Esq.

(57) ABSTRACT

A leadscrew mechanical drive includes a leadscrew having a leadscrew axis and a leadscrew thread with a nonzero leadscrew thread pitch, and a leadscrew follower structure engaged to the leadscrew. The leadscrew follower structure includes a threaded insert having an insert thread with a nonzero insert thread pitch different from the leadscrew thread pitch, which is threadably engaged to the leadscrew. The leadscrew follower structure further includes a bearing in which the threaded insert is received and which permits the threaded insert to rotate about the insert axis, a bearing support in which the bearing is received, and a preload structure which biases the insert thread against the leadscrew thread.

21 Claims, 1 Drawing Sheet

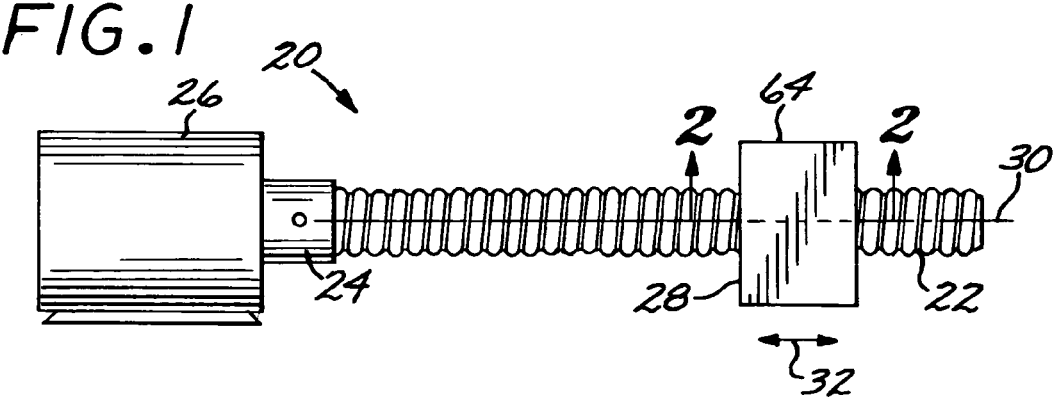
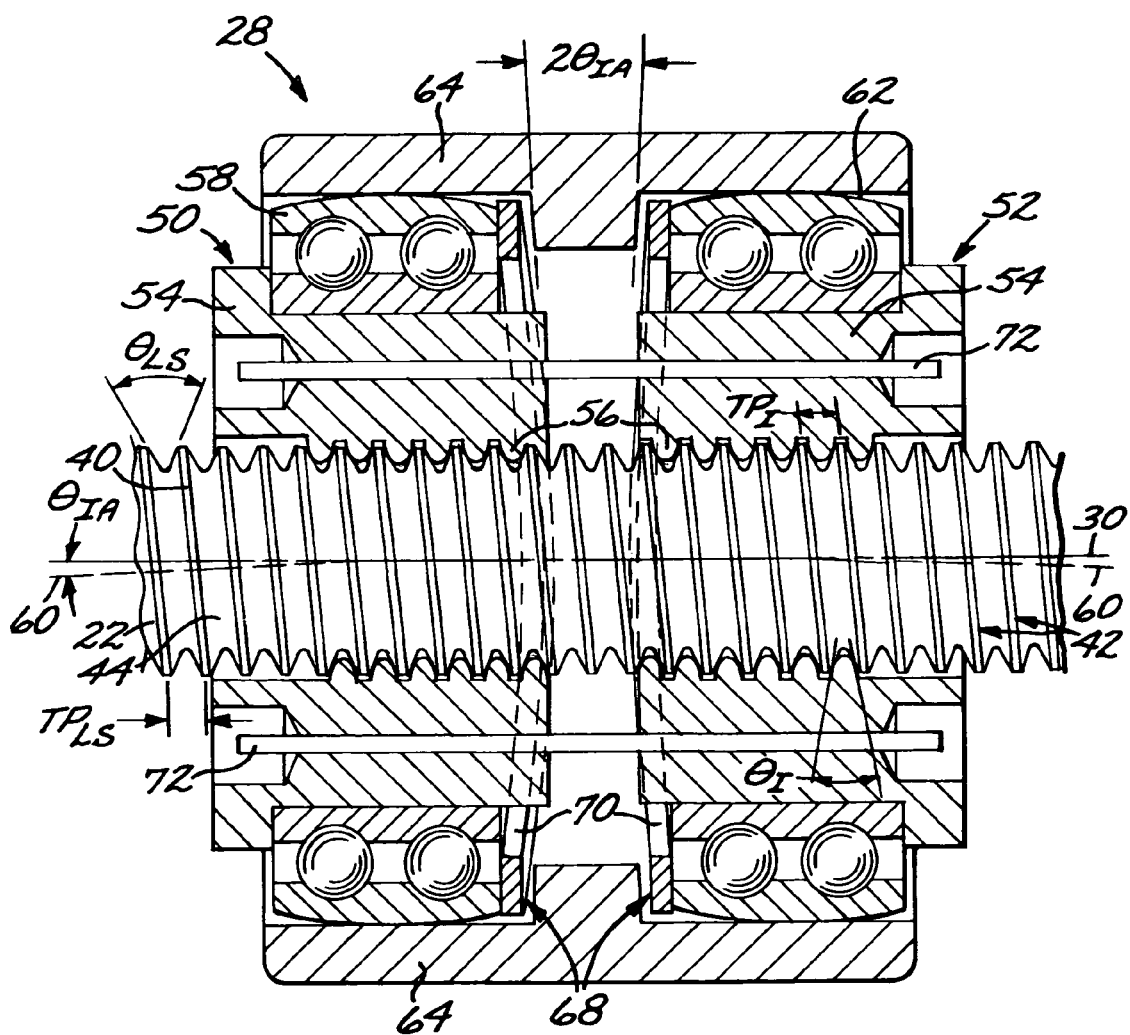

LEADSCREW MECHANICAL DRIVE WITH DIFFERENTIAL LEADSCREW FOLLOWER STRUCTURE

This application is a continuation in part of application Ser. No. 10/271,479, filed Oct. 15, 2002, now U.S. Pat. No. 6,931,960 for which priority is claimed and whose disclosure is incorporated by reference.

This invention relates to a leadscrew mechanical drive and, more particularly, to a leadscrew mechanical drive utilizing a leadscrew and a leadscrew follower structure.

BACKGROUND OF THE INVENTION

Most common electrical motors have a rotational output, but in many instances the structure to be driven requires a linear motion. There are a number of approaches to mechanically converting the rotational motor output to a linear motion. One such approach is a leadscrew mechanical drive in which the motor rotationally drives a threaded leadscrew. A leadscrew follower structure driven by the leadscrew engages the leadscrew and moves parallel to the axis of the leadscrew to convert the rotational motion to linear motion parallel to the axis of the leadscrew. The leadscrew follower structure typically includes a follower threadably engaged to the leadscrew or a recirculating ball mechanism, although other types of leadscrew followers have been proposed.

The conventional leadscrew mechanical drive works well in many situations, but has limitations in others. If the linear motion is to be very slow, the basic leadscrew mechanical drive must be modified in one of several ways. The leadscrew must have a small thread pitch, the leadscrew must be driven through a speed-reducing gearbox placed between the motor and the leadscrew, and/or special motor controls such as a high-resolution rotary optical encoder must be used to measure and control the motor output in a feedback manner. Additionally, care must be taken to minimize play and backlash in the leadscrew mechanical drive. Some of these modifications have physical limitations that limit the ability to achieve the desired slow linear movement. For example, the reduction in thread pitch is limited by the physical width between the turns of the thread that may be achieved by machining or other thread-producing technique. The efficiency of speed-reducing gearboxes falls with increasing reduction ratio, requiring a larger motor for high reduction ratios. The ability to reduce the rotational output speed of the motor is limited by the structure of the motor windings, so that it may be necessary to use a special low-speed motor. In any event, these modifications lead to an expensive, bulky, and/or heavy leadscrew mechanical drive that may not be suitable for the desired applications.

There is therefore a need for an improved approach to the mechanical conversion of rotary motion to linear motion, particularly for applications in which the required linear motion is very slow. The present invention fulfills this need, and further provides related advantages.

SUMMARY OF THE INVENTION

The present invention provides a leadscrew mechanical drive with a selectable transmission ratio between the rotational rate of the leadscrew and the linear rate of motion of the leadscrew follower structure. The linear motion of the leadscrew follower structure may be selected to be faster or slower than that of the normal leadscrew mechanical drive, but the greatest advantage is achieved when the linear motion is slower than that of the normal leadscrew mechanical drive. In that instance, the speed reduction is accomplished entirely in the leadscrew/leadscrew follower mechanism. No modification to the motor or motor controller is required, and no separate speed-reducing gearbox is used. The leadscrew mechanical drive is inexpensive, light, and compact. High linear positional resolution and accuracy, coupled with a low movement rate, may be readily achieved. The leadscrew itself may be manufactured with a readily achieved thread pitch, so that no special manufacturing procedures are required for the leadscrew. Slippage between the threads, play in the structure, and backlash upon reversal of the direction of rotation of the leadscrew are minimized. The present leadscrew mechanical drive is suitable for all duty ranges, including light, medium, and heavy duty applications, but its greatest advantages are realized in medium and heavy duty applications where the rate of linear motion is relatively slow and the forces to be transmitted are relatively large.

In accordance with the invention, a leadscrew mechanical drive comprises a leadscrew having a leadscrew axis and a leadscrew thread with a nonzero leadscrew thread pitch, and a leadscrew follower structure engaged to the leadscrew. The leadscrew preferably is a one-piece leadscrew having the leadscrew thread integral with the leadscrew body. The leadscrew follower structure includes a threaded insert having an insert thread that is threadably engaged to the leadscrew. The insert thread has a nonzero insert thread pitch different from the leadscrew thread pitch. The leadscrew thread pitch may be less than or greater than the insert thread pitch, but the leadscrew thread pitch and the insert thread pitch cannot be the same. The leadscrew follower structure further includes a bearing in which the threaded insert is received and which permits the threaded insert to rotate about an insert axis, wherein the insert axis is angularly rotated from the leadscrew axis. The insert axis is preferably angularly rotated from the leadscrew axis by an inclination angle of from about ¼ degree to about 1½ degrees. The leadscrew follower structure further includes a bearing support in which the bearing is received, and a preload structure which biases the insert thread against the leadscrew thread.

Desirably, the leadscrew thread fits loosely with the insert thread. As used herein "loosely" means that there is sufficient clearance between the leadscrew and the leadscrew follower structure so that the leadscrew may tilt relative to the leadscrew follower structure by the inclination angle of from about ¼ degree to about 1½ degrees. It is preferred that a leadscrew included thread angle of the leadscrew thread is greater than an insert included thread angle of the insert thread. Preferably, a difference between the leadscrew thread pitch and the insert thread pitch greater than 0 but no more than about 0.125 percent of the leadscrew thread pitch.

The preload structure preferably comprises a spring that applies a preload force to the insert, and a restraint that reacts the preload force to restrain a movement of the insert.

There is optionally a motor that drives the leadscrew. Desirably, the leadscrew mechanical drive includes a synchronous motor. The leadscrew mechanical drive desirably has no speed-reducing gearbox therein.

The benefits of the present approach may be achieved using a single leadscrew follower, but a preferred design uses two cooperating leadscrew followers (and thence two threaded inserts). Thus, in a preferred embodiment a leadscrew mechanical drive comprises a leadscrew having a leadscrew axis and a leadscrew thread with a nonzero leadscrew thread pitch, and a leadscrew follower structure engaged to the leadscrew. The leadscrew follower structure includes a first leadscrew follower and a substantially identical second leadscrew follower. Each leadscrew follower includes a threaded insert having an insert thread with a nonzero insert thread pitch different from the leadscrew thread pitch, and which is threadably engaged to the leadscrew thread. Each leadscrew follower further includes a bearing in which the threaded insert is received and which permits the threaded insert to rotate about an insert axis, wherein the insert axis is angularly rotated from the leadscrew axis, a bearing support in which the bearing is received, and a preload structure that biases each of the leadscrew followers against the leadscrew in opposite directions. Compatible features discussed elsewhere herein may be used with this embodiment.

In a conventional leadscrew mechanical drive where the thread pitch of the leadscrew and the thread pitch of the leadscrew follower structure are the same, the leadscrew follower structure closely engages the leadscrew over several turns and moves linearly by the amount of the thread pitch with each revolution of the leadscrew. In the present approach where the thread pitches of the leadscrew and the leadscrew follower structure are different and the threaded insert rotates on its bearing, the leadscrew follower structure moves linearly by the difference between the thread pitches with each revolution of the leadscrew, thereby achieving a differential drive effect. A small linear movement rate may be achieved by making the thread pitches of the leadscrew and the leadscrew follower structure close to the same but slightly different. Having a different thread pitch of the leadscrew and the leadscrew follower structure is not possible with conventional leadscrews, because the mismatch would lead to binding between the two threads. In this case, however, binding between the thread of the leadscrew and the thread of the leadscrew follower structure is avoided by angularly displacing the leadscrew axis and the insert axis by a small amount, and by providing for a loose fit between the two sets of threads.

Another important advantage of the present approach is that the efficiency of load transfer from the drive motor to the driven structure is about 90-98 percent, independent of the reduction ratio. The high efficiency is a result of the low friction between the leadscrew and the insert. By contrast, a conventional leadscrew mechanical drive has increasing friction, and thence decreasing efficiency, as the reduction ratio increases and the movement of the driven structure becomes slower. For a reduction ratio of 8000:1 and using a high-quality speed-reducing gearbox, a conventional leadscrew mechanical drive has an efficiency of about 50-60 percent, with a significant fraction of the drive power being lost to friction. The load which may be transmitted using the present approach actually increases with increasing reduction ratio, while the load which may be transmitted using the conventional approach decreases with increasing reduction ratio.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic representation of a leadscrew mechanical drive; and

FIG. 2 is a sectional view of the leadscrew and a preferred form of the leadscrew follower structure used in the leadscrew mechanical drive of FIG. 1, taken on line 2-2.

DETAILED DESCRIPTION OF THE INVENTION

FIG. 1 depicts a leadscrew mechanical drive 20. The leadscrew mechanical drive 20 includes an externally threaded leadscrew 22 that is driven by a rotational output 24 of a motor 26 or other power source. The motor is preferably a synchronous motor such as a conventional high-speed motor, although other types of motors such as stepper motors may also be used. Preferably and as illustrated, there is no speed-reducing gearbox in the leadscrew mechanical drive between the rotational output 24 and the threaded leadscrew 22. A leadscrew follower structure 28 is threadably engaged to the leadscrew 22. As the motor 26 turns the threaded leadscrew 22 about its rotational leadscrew axis 30, the threaded engagement between the leadscrew follower structure 28 and the leadscrew 22 translates the rotational movement of the leadscrew 22 into linear movement of the leadscrew follower structure 28 in a linear movement direction 32 parallel to the rotational leadscrew axis 30. The leadscrew follower structure 28 is attached to the structure (not shown) that is to be moved in the linear manner.

FIG. 2 depicts the leadscrew 22 and the leadscrew follower structure 28 of a preferred embodiment of the present approach in schematic sectional view and in greater detail. The leadscrew 22 comprises a helical leadscrew thread 40 having a series of turns 42 with a thread pitch $TP_{LS}$. The thread pitch of the leadscrew thread 40 is defined as the linear distance between two adjacent turns 42 of the leadscrew thread 40 measured parallel to the leadscrew axis 30. The leadscrew thread pitch $TP_{LS}$ is nonzero and may be either a left-hand sense or a right-hand sense. A leadscrew included thread angle $\theta_{LS}$, measured at the base of the leadscrew thread 40, is preferably from 50 to 70 degrees, most preferably 60 degrees. The leadscrew included thread angle is a measure of the profile and shape of the leadscrew thread 40. The illustrated leadscrew 22 is a one-piece machined leadscrew having the leadscrew thread 40 integral with a leadscrew body 44. The leadscrew 22 may instead be a wire-wound leadscrew of the type disclosed in U.S. Pat. No. 5,636,549. The machined, one-piece leadscrew is preferred, as it can handle larger loads and heavier-duty applications than can the wire-wound leadscrew.

The leadscrew follower structure 28 is threadably engaged to the leadscrew 22. The leadscrew follower structure 28 includes at least one, and preferably exactly two, leadscrew followers in a cooperating relationship. The present approach is operable with a single leadscrew follower of the type described next, but the force-balanced approach achieved using two leadscrew followers is preferred and will be described.

The illustrated leadscrew follower structure 28 includes a first leadscrew follower 50 and a second leadscrew follower 52. The physical structures of the first leadscrew follower 50 and the second leadscrew follower 52 are preferably substantially identical, and the two leadscrew followers 50 and 52 are arranged in a cooperating manner as will be described.

Each leadscrew follower 50, 52 includes a threaded insert 54 having an internal insert thread 56 with a nonzero insert thread pitch $TP_I$. The thread pitch of the insert thread 56 is defined as the linear distance between two adjacent turns of the insert thread 56 measured parallel to an insert axis 60.

The insert thread 56 of the threaded insert 54 is threadably engaged to the leadscrew thread 40 of the leadscrew 22. The sense of the leadscrew thread 40 and the insert thread 56 are the same—that is, both are left-hand threads or both are right-hand threads. An insert included thread angle $\theta_1$, measured at the base of the insert thread 56, is preferably from 20 degrees to 40 degrees, most preferably 30 degrees. The insert included thread angle is a measure of the profile and shape of the leadscrew thread 40. The leadscrew included thread angle $\theta_{LS}$ of the leadscrew thread 40 is preferably greater than the insert included thread angle $\theta_1$ of the insert thread 56. The present approach will function if the leadscrew included thread angle $\theta_{LS}$ of the leadscrew thread 40 is the same as the insert included thread angle $\theta_1$ of the insert thread 56, but there will be increased wear between the two threads 40 and 45. The insert thread 56 is preferably rounded at its high point to achieve a line contact with the leadscrew thread 40 and to minimize the possibility that there will be binding between the insert thread 56 and the leadscrew thread 40.

An important requirement of the present approach is that the insert thread pitch $TP_I$ is different from the leadscrew thread pitch $TP_{LS}$. The leadscrew thread pitch $TP_{LS}$ may be less than or greater than the insert thread pitch $TP_I$, but the leadscrew thread pitch $TP_{LS}$ and the insert thread pitch $TP_I$ cannot be the same. The present approach of a differential leadscrew follower structure is not operable if the insert thread pitch $TP_I$ is the same as the leadscrew thread pitch $TP_{LS}$. If the two thread pitches $TP_I$ and $TP_{LS}$ were the same, the insert 54 would idle in one position and not advance in either direction. Desirably, a difference between the leadscrew thread pitch $TP_{LS}$ and the insert thread pitch $TP_I$ is no more than 0.125 percent (i.e., ⅛ of 1 percent) of the leadscrew thread pitch $TP_{LS}$. If the difference is substantially greater, there is an increased risk of binding and there is less thread length actually carrying load.

The amount of linear advance LA of the leadscrew follower structure 28 parallel to the linear movement direction 32, for each revolution of the leadscrew 22 about its rotational leadscrew axis 30, is $LA=(TP_I-TP_{LS})$. By making $TP_{LS}$ and $TP_I$ close to each other but not the same value, LA may be made small and less than either $TP_{LS}$ or $TP_I$. Thus, for example, if $TP_I$ is 10.0125 millimeters and $TP_{LS}$ is 10.0000 millimeters, the linear advance LA per revolution of the leadscrew 22 is (10.0125−10.0000) millimeters, or 0.0125 millimeters, for an 800:1 reduction ratio. If $TP_I$ is 10.00125 millimeters and $TP_{LS}$ is 10.0000 millimeters, the linear advance LA per revolution of the leadscrew 22 is (10.00125−10.0000) millimeters, or 0.00125 millimeters, for an 8000:1 reduction ratio. By comparison, if the standard approach is used wherein the thread pitch of the leadscrew and the leadscrew follower structure are the same at 10.000 millimeters, the linear displacement of the leadscrew mechanical drive is 10/20 or 0.5 millimeters, for a 20:1 reduction ratio. The present approach can thus achieve a much higher reduction ratio than can the conventional approach, in each case without using any reducing gearbox.

Each of the threaded inserts 54 is received in a bearing 58 which permits the threaded insert 54 to rotate about the insert axis 60 that is inclined to the leadscrew axis 30 by an inclination angle $\theta_{IA}$. The threaded insert 54 thus rotates about its insert axis 60 as the leadscrew 22 rotates about its leadscrew axis 30. (By comparison, a conventional leadscrew follower has no bearing comparable with the bearing 58, and the follower threads do not rotate as the leadscrew rotates.) The bearing 58 may be of any operable type, and is illustrated as a ball bearing. If there are two leadscrew followers 50 and 52 as in the illustrated embodiment, it is preferred that the inclination angle of the insert axis 60 of the first leadscrew follower 50 is $\theta_{IA}$, and that the inclination angle of the insert axis 60 of the second leadscrew follower 52 is the negative of the inclination angle for the first leadscrew follower, or $-\theta_{IA}$. The value of the inclination angle $\theta_{IA}$, by which the insert axis 60 is angularly rotated from (i.e., inclined to or angularly displaced from) the leadscrew axis 30, is greater than zero and less than 1½ degrees, and more preferably from ¼ degree to 1½ degrees. Inclination angles of greater than 1½ degrees lead to a reduced load-carrying ability of the leadscrew mechanical drive because of a reduced thread contact between the leadscrew thread 40 and the insert thread 56. Inclination angles of less than ¼ degree are operable, but lead to a full thread-to-thread contact and not the line contact that is important for the functioning of the present approach. This arrangement facilitates the preloading that is discussed subsequently.

To allow this small angular offset by the inclination angle $\theta_{IA}$, the fit between the leadscrew thread 40 and the insert thread 56 must be relatively loose. "Loose" in this context means that there is sufficient clearance between the leadscrew and the leadscrew follower structure so that the leadscrew may tilt relative to the leadscrew follower structure by the inclination angle of from about ¼ degree to about 1½ degrees.

The inclination between the insert axis 60 and the leadscrew axis 30 causes the insert thread 56 to be engaged to the leadscrew thread 40 only at two line contacts, one on each end of each of the inserts 54. (That is, each of the inserts 54 has two line contacts.) Each line contact extends over a circumferential distance of less than one-half turn of the insert thread 56 and one-half turn of the leadscrew thread 40. By engaging the two threads 56 and 40 over such a short circumferential distance and on the oppositely disposed ends of the insert 54, there is substantially no binding of the two threads 56 and 40 of different pitches.

The bearing 58 is received in and supported by a bearing support 64. The bearing support 64 has a structure such as the illustrated shoulders that holds the bearing 58 and thence the insert 54 in the desired orientation with the desired inclination angle(s) $+/-\theta_{IA}$. The outer surface 62 of the outer race of the bearing 58 is desirably slightly crowned so that it may rock against the bearing support 64 as the threaded inserts 54 turn. The bearing support 64 may, as illustrated, serve as a follower-structure housing.

A preload structure 68 biases each of the leadscrew followers 50 and 52 (or a single leadscrew follower, where used) against the leadscrew 22 in opposite tilting directions, to achieve the desired inclination angle(s) $+/-\theta_{IA}$. The insert thread 56 is forced against the leadscrew thread 40 to minimize slippage between the two threads, to minimize play in the structure, and to minimize backlash when the direction of rotation of the leadscrew 22 is reversed. Any operable preload structure 68 may be used. In a preferred preload structure 68 illustrated in FIG. 2, a spring 70 in the form of a dished washer applies a preload force between the bearing support 64 and the insert 54. A restraint 72 in the form of a connecting spring rod extends between the two threaded inserts 54 to react the preload force and to restrain a movement of the threaded inserts 54. The preferred leadscrew mechanical drive 20 is assembled by threading the inserts 54 onto the leadscrew 22 with the connecting spring rod extending through one of the inserts 54. The second insert 54 is then match drilled at the location of the other insert 54 that produces a desired spring force in the springs 70, and the connecting spring rod is pushed through the resulting drilled hole and fixed at its ends.

The present invention as illustrated in FIGS. 1-2 has been reduced to practice and found to be operable as described herein.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A leadscrew mechanical drive comprising:
   a leadscrew having a leadscrew axis and a leadscrew thread with a nonzero leadscrew thread pitch; and
   a leadscrew follower structure engaged to the leadscrew, the leadscrew follower structure including
      a threaded insert having an insert thread with a nonzero insert thread pitch different from the leadscrew thread pitch, wherein the threaded insert is threadably engaged to the leadscrew thread,
      a bearing in which the threaded insert is received and which permits the threaded insert to rotate about an insert axis, wherein the insert axis is angularly rotated from the leadscrew axis,
      a bearing support in which the bearing is received, and
      a preload structure which biases the insert thread against the leadscrew thread, said preload structure further comprising a spring in the form of a dished washer that applies a preload force to the insert.

2. The leadscrew mechanical drive of claim 1, wherein the insert axis is angularly rotated from the leadscrew axis by an angle of from about ¼ degree to about 1½ degrees.

3. The leadscrew mechanical drive of claim 1, wherein a leadscrew included thread angle of the leadscrew thread is greater than an insert included thread angle of the insert thread.

4. The leadscrew mechanical drive of claim 1, wherein a difference between the leadscrew thread pitch and the insert thread pitch is no more than about 0.125 percent of the leadscrew thread pitch.

5. The leadscrew mechanical drive of claim 1, wherein the leadscrew thread pitch is greater than the insert thread pitch.

6. The leadscrew mechanical drive of claim 1, wherein the leadscrew thread pitch is less than the insert thread pitch.

7. The leadscrew mechanical drive of claim 1, wherein the leadscrew comprises a one-piece leadscrew having the leadscrew thread integral with a leadscrew body.

8. The leadscrew mechanical drive of claim 1, wherein the preload structure further comprises
   a restraint that reacts the preload force to restrain a movement of the insert.

9. The leadscrew mechanical drive of claim 8 including a second threaded insert and said restraint includes a connecting spring rod coupled between said threaded inserts.

10. The leadscrew mechanical drive of claim 1, wherein the leadscrew mechanical drive has no speed-reducing gearbox therein.

11. The leadscrew mechanical drive of claim 1, further including a motor that drives the leadscrew.

12. A leadscrew mechanical drive comprising:
    a leadscrew having a leadscrew axis and a leadscrew thread with a nonzero leadscrew thread pitch; and
    a leadscrew follower structure engaged to the leadscrew, wherein the leadscrew follower structure includes a first leadscrew follower and a second leadscrew follower, wherein the first leadscrew follower and the second leadscrew follower are substantially identical, and wherein each leadscrew follower includes
       a threaded insert having an insert thread with a nonzero insert thread pitch different from the leadscrew thread pitch, wherein the threaded insert is threadably engaged to the leadscrew thread,
       a bearing in which the threaded insert is received and which permits the threaded insert to rotate about an insert axis, wherein the insert axis is angularly rotated from the leadscrew axis,
       a bearing support in which the bearing is received, and
       a preload structure that biases each of the leadscrew followers against the leadscrew in opposite directions, said preload structure further comprising a spring in the form of a dished washer that applies a preload force to the insert.

13. The leadscrew mechanical drive of claim 12, wherein the preload structure further comprises
    a restraint that reacts the preload force to restrain a movement of the insert.

14. The leadscrew mechanical drive of claim 13 including a second threaded insert and said restraint includes a connecting spring rod coupled between said threaded inserts.

15. The leadscrew mechanical drive of claim 12, wherein the leadscrew thread pitch is less than the insert thread pitch.

16. The leadscrew mechanical drive of claim 12, wherein the leadscrew comprises a one-piece leadscrew having the leadscrew thread integral with a leadscrew body.

17. The leadscrew mechanical drive of claim 12, wherein a leadscrew included thread angle of the leadscrew thread is greater than an insert included thread angle of the insert thread.

18. The leadscrew mechanical drive of claim 12, wherein a difference between the leadscrew thread pitch and the insert thread pitch is no more than about 0.125 percent of the leadscrew thread pitch.

19. The leadscrew mechanical drive of claim 12, further including
    a synchronous motor that drives the leadscrew.

20. The leadscrew mechanical drive of claim 12, wherein the insert axis is angularly rotated from the leadscrew axis by an angle of from about ¼ degree to about 1½ degree.

21. The leadscrew mechanical drive of claim 12, wherein the leadscrew thread pitch is greater than the insert thread pitch.

\* \* \* \* \*